US008484675B2

(12) United States Patent
Coppens et al.

(10) Patent No.: US 8,484,675 B2
(45) Date of Patent: Jul. 9, 2013

(54) MULTIMEDIA DISTRIBUTION SYSTEM WITH USER BEHAVIOR ANALYZER

(75) Inventors: Toon Coppens, Lier (BE); Lieven Leopold Albertine Trappeniers, Herentals (BE); Marc Bruno Frieda Godon, Londerzeel (BE); Koen Handekyn, Ghent (BE); Rony Alfons Maria Baekeland, Antwerp (BE); Sigurd Van Broeck, Zoersel (BE); Hendrik Eugène Irène Nicolas Dacquin, Ghent (BE); Jan Lode Mia Moons, Heist-op-den-Berg (BE); Arjen Hendrikse, Etterbeek (BE); Jan Alfons Albert Bouwen, Antwerp (BE)

(73) Assignee: Alcatel Lucent, Paris (FR)

( * ) Notice: Subject to any disclaimer, the term of this patent is extended or adjusted under 35 U.S.C. 154(b) by 1744 days.

(21) Appl. No.: 11/190,832

(22) Filed: Jul. 28, 2005

(65) Prior Publication Data

US 2006/0034314 A1     Feb. 16, 2006

(30) Foreign Application Priority Data

Aug. 2, 2004  (EP) ..................................... 04291975

(51) Int. Cl.
*H04N 7/10* (2006.01)
(52) U.S. Cl.
USPC ................................. 725/34; 725/32; 725/36
(58) Field of Classification Search
USPC ....................................................... 725/9, 36
See application file for complete search history.

(56) References Cited

U.S. PATENT DOCUMENTS

| | | | | |
|---|---|---|---|---|
| 6,446,261 | B1* | 9/2002 | Rosser .............................. | 725/34 |
| 2002/0019769 | A1 | 2/2002 | Barritz et al. | |
| 2003/0005438 | A1 | 1/2003 | Crinon et al. | |
| 2003/0101451 | A1* | 5/2003 | Bentolila et al. ................. | 725/34 |
| 2003/0177490 | A1* | 9/2003 | Hoshino et al. .................. | 725/34 |
| 2003/0188308 | A1* | 10/2003 | Kizuka ............................. | 725/32 |

OTHER PUBLICATIONS

A. Janevski et al, "Enhanced Video Viewing from Metadata", Proceedings of the SPIE, Bellingham, VA, US, vol. 4518 Aug. 21, 2001, pp. 106-117, XP001133830.

* cited by examiner

*Primary Examiner* — Vivek Srivastava
*Assistant Examiner* — Junior Mendoza
(74) *Attorney, Agent, or Firm* — Mendelsohn, Drucker & Associates, P.C.; Yuri Gruzdkov; Steve Mendelsohn

(57) ABSTRACT

A multimedia distribution system or interactive digital television broadcast system (iDTV) comprising several content providers (CP: CP1, CP2) broadcasting channels of video signals to a user (TV, STB) via a content selector (CS). The broadcast system comprises a user behavior analyzer (UBA) with quantitative behavior classifier (E(w)) able to analyze and to classify the quantitative consumption behavior of the user, and with a qualitative behavior classifier (F(x)) having as output classified user behaviors and prediction on future behaviors of the user. The classifiers are coupled to an opportunities selector (G(y)) that also receives information from additional content providers (ACP: ACP1, ACP2, ACP3). Under control of the opportunities selector G(y), additional content, e.g. advertisements, meta-information, iTV applications, trailers, . . . is send to a multimedia data combiner (H(z)) whereby the additional content is published, e.g. by mixing or by an overlay operation on/ over the selected channel. As a result, the end-user gets his broadcast channel adapted with the content that was selected based on his consumption behavior. The role of the qualitative behavior classifier classifying and predicting the user consumption behaviors is different from the role of the opportunities selector defining, predicting and classifying windows of opportunities to publish/add content from additional content providers; and the interface (I2) between them has an important role as business-to-business (B2B) interface.

8 Claims, 1 Drawing Sheet

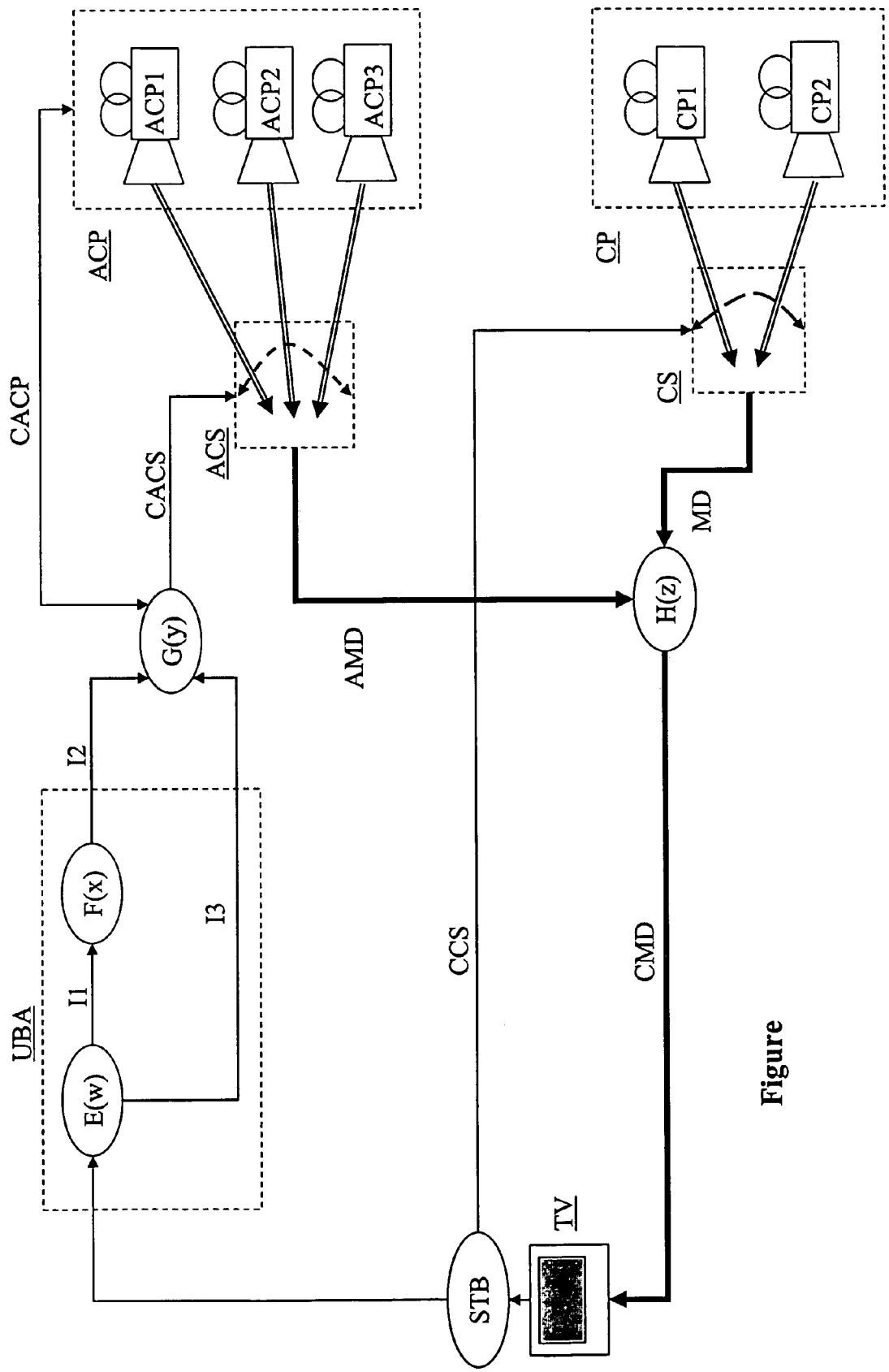
Figure

MULTIMEDIA DISTRIBUTION SYSTEM WITH USER BEHAVIOR ANALYZER

The present invention relates to a multimedia distribution system comprising a plurality of content providers adapted to broadcast multimedia data to an end-user via a content selector controlled by said end-user to receive multimedia data from a selected one of said content providers, said system further comprising a user behavior analyzer to which said end-user is coupled and that is adapted to analyze the behavior of said end-user.

BACKGROUND OF THE INVENTION

Such a multimedia distribution system, also called interactive digital broadcast system, comprising a user behavior analyzer is generally known in the art. It is used to broadcast for instance television or radio and comprises at least one digital content provider that sends a downstream digital broadcast stream of multimedia data to a broadcast operator comprising the content selector. The broadcast operator then broadcasts selected digital streams to end-users or subscribers, either by satellite, cable, terrestrial broadcasting or over a broadband (possibly IP) Internet infrastructure like ADSL, VDSL, . . . The user feedback to the broadcast operator, e.g. for channel selection on the content selector, can happen in the telecommunication network by means of an interaction return channel. This return channel can be narrowband dial-up, broadband DSL, leased-line, wireless, IP, non-IP, . . .

Known digital broadcasting systems provide identical content to all users with the meta-information, content additions, e.g. advertisements, and interactive applications inserted at the source.

User's real time behavior can be gathered in a database. It may consist of user's channel selection, user's interaction in interactive applications, . . . For instance, a user X is listening to a channel Y at time T1 and is listening to a channel Z at time T2. From this user behavior information, data mining methods can for instance identify channel attendance statistics.

A problem with the known multimedia distribution system is that it does not allow for adding multimedia content in the system by content providers or broadcast operators depending on the behavior of the end-user.

SUMMARY OF THE INVENTION

An object of the present invention is to provide a multimedia distribution system of the above known type but wherein is provided an opportunity for broadcasting additional multimedia data depending on the consumer consumption profile and behavior of the end-user.

According to the invention, this object is achieved due to the fact that said multimedia distribution system further comprises a plurality of additional content providers adapted to broadcast second multimedia data to said end-user via a second content selector and a multimedia data combiner, said multimedia data combiner being adapted to combine said second multimedia data with the first mentioned multimedia data into a combined multimedia data signal transmitted to said end-user, and that said second content selector is controlled by an opportunities selector having as input control signals received from said user behavior analyzer and from said additional content providers.

In this way, the opportunities selector may receive from the user behavior analyzer information concerning the user's broadcast consumption behavior and may receive from the additional content providers other information concerning available second or additional multimedia data to broadcast. With these two kinds of information, the opportunities selector controls the second content selector to add suitable additional multimedia data to the current multimedia data already received by the end-user.

Another characterizing embodiment of the present invention is that the control signals provided by said additional content providers to said opportunities selector contain information about the second multimedia data able to be broadcasted by said additional content providers to said end-user.

Owing to these control signals, second or additional multimedia data or content is identified in the opportunities selector by classification of the user's consumption behavior and the opportunities for publishing from the additional content providers. The selected additional content is then combined, i.e. added/mixed/overlaid, in the network over the already present multimedia data or channel selected by the end-user. This additional content can be, e.g., audiovisual information, text, meta-information, scripts, advertisements, interactive applications, etc . . .

The present multimedia distribution system has its applicability in, e.g., Interactive Television iTV, digital TV, Broadcast over DSL (Digital Subscriber Line), Video-on-Demand VoD, Digital Audio Broadcasting, . . . The solution empowers the content providers to personalize the content, resulting in a higher perceived added-value for the end-user, i.e. the consumer. The users are helped to escape the limitations of the current broadcast content as third-party content providers and advertisement providers can publish their extra content.

Also another characterizing embodiment of the present invention is that said user behavior analyzer comprises a quantitative behavior classifier to which said end-user is coupled and which is adapted to analyze the quantitative behavior of said end-user, and a qualitative behavior classifier to which said quantitative behavior classifier is coupled and which is adapted to classify the behavior of said end-user and to predict future behavior of said end-user, and that both said quantitative behavior classifier and said qualitative behavior classifier are adapted to provide control signals to be applied to said opportunities selector.

The role of the quantitative behavior classifier is to classify and to predict the user consumption behavior; whilst the role of the qualitative behavior classifier is to define, to predict and to classify windows of opportunities to publish/add content. The coupling between the qualitative behavior classifier and the opportunities selector may therefore be seen as a very important business-to-business (B2B) interface with respect to the valuable business data transmitted there over.

In a preferred characterizing embodiment of the present invention, the end-user behavior analyzed by said user behavior analyzer comprises information about the selection behavior of said end-user.

This will allow the opportunities selector to make predictions about the short term zapping behavior of the user and to classify the user's application interactivity behavior in some classes, in relation with his current and dynamic interactivity behavior. As an example, a quantitative behavior of the user may be which channel he is watched and at which time, whilst a qualitative behavior may be the order of zapping: increasing, decreasing, last zapped channel. Examples of classes are: interacting without goal, short focus, long focus, nervous interacting, absent, . . .

Yet another characterizing embodiment of the present invention is that said opportunities selector is adapted to transmit information about the end-user's behavior to said additional content providers.

In other words, the information collected by the opportunities selector may be transferred to and used by the additional content providers. This will allow the additional content providers to get dynamical information on user's application interactivity behavior, e.g. for bulk analysis. Consequently, the additional content providers should send real-time targeted content and interactive applications towards the user, while better and faster adapting their additional content, e.g. advertisements.

Also in a preferred characterizing embodiment of the present invention, at least one of said content providers is also an additional content provider.

In this way, the content provider may supply the additional content on top of its 'normal' multimedia data, i.e. its broadcasted channels. Additionally, by the information received from the opportunities selector, the content provider may be advised about content that should be shown on its channels in the future.

Again in a preferred embodiment, said end-user is coupled to said user behavior analyzer by a set-top box located at the end-user's premises, and said set-top box is coupled to said content selector to control the selection of the broadcast multimedia data to be provided from a selected one of said content providers to said end-user.

A set-top box as such is already known in the art. Its use within the present multimedia distribution system is however new and provides additional useful functions.

Further characterizing embodiments of the present multimedia distribution system are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein the single FIGURE represents a multimedia distribution system with an opportunities selector receiving information from an end-user behavior analyzer and from several content providers according to the invention.

BRIEF DESCRIPTION OF THE DRAWINGS

FIG. 1 is an illustration of an interactive digital television broadcasting system.

DETAILED DESCRIPTION OF EXEMPLARY EMBODIMENTS OF THE INVENTION

The multimedia distribution system shown at the FIGURE is an interactive digital television broadcast system (iDTV) comprising several content providers CP1, CP2, more generally indicated by CP. Each content provider broadcasts multimedia data or iDTV content, e.g. channels of video signals, to a content selector CS. One of the channels is further transmitted from the content selector CS to an end-user TV. The end-user premise is generally provided with a television set TV associated to a set-top box STB. Owing to this set-top box STB, the end-user, hereafter more generally called user, is able to control, via an interconnection CCS, the content selector CS to select the content provider CP1 or CP2 from which he wants to receive the multimedia data or channel MD.

The television broadcast system further comprises a user behavior analyzer UBA that receives information signals from the user, preferably via the set-top box STB. The user behavior analyzer UBA comprises a quantitative behavior classifier E(w) able to analyze and to classify the quantitative consumption behavior of the user, and coupled via an interface I1 to a qualitative behavior classifier F(x) having as output classified user behaviors and prediction on future behaviors of the user.

An example of user behavior analyzed by the user behavior analyzer UBA is information about the selection behavior of the user as received from his set-top box STB. Qualitative consumption behavior of the user can for instance be application interactivity, communication in a community application, emoticons used in a community application, etc . . .

The quantitative behavior classifier and the quantitative behavior. classifier both provide control signals that are applied to an opportunities selector G(y) via respective interfaces I3 and I2.

The opportunities selector G(y) is coupled via a link CACP to several additional content providers ACP1, ACP2, ACP3, more generally indicated by ACP.

The additional content providers ACP are similar to the content providers CP in that they broadcast second or additional multimedia data. In a preferred embodiment, some or all of the content providers CP are also additional content providers ACP. The second multimedia data broadcasted by the additional content providers ACP are transmitted to a second content selector ACS. One of the second multimedia data is then further transmitted as broadcast signal AMD from the second content selector ACS to a multimedia data combiner H(z). The multimedia data combiner H(z) is designed to combine the second multimedia data AMD received from the second content selector ACS with the multimedia data MD received from the content selector CS into a combined multimedia data signal CMD further transmitted to the end-user TV.

The second content selector ACS is controlled by the opportunities selector G(y) via a link CACS. The opportunities selector G(y) has input control signals received from the user behavior analyzer UBA via the interfaces I2 and I3, as well as from the additional content providers ACP via the above link CACP. The control signals transmitted on the link CACP from the additional content providers ACP to the opportunities selector G(y) contain information about the second multimedia data able to be broadcasted by the additional content providers to the end-user TV. In return, the opportunities selector G(y) is preferably adapted to transmit information about the user's behavior to the additional content providers ACP.

In more detail, the role of the qualitative behavior classifier F(x) classifying and predicting the user consumption behavior and the role of the opportunities selector G(y) defining, predicting and classifying windows of opportunities to publish/add content are generally different, so that the interface I2 has an important role as business-to-business (B2B) interface between F(x) and G(y).

The qualitative user behavior classification results can either be sent to the opportunities selector G(y) that runs a content decision process by subscription, event-triggering, or can be polled by this content decision process. Optimally, the interface I2 supports all these modes of operation.

The interface I2 is likely to contain methods along these lines, such as:
getUserBehaviorClassAndPrediction: where it returns
class and prediction
per user,
per user groups, or
per geographical region;
getUsersForCriteria: where it returns collection of users
per behavior class (e.g. BBC™ fans watching a cooking program),
per prediction (e.g. users likely to zap to "National Geographic"™);
notifyUsersAboutToSwitch: where it passes a collection of users;
subscribeToBehaviorClass( ... );
...

From the information passed over the B2B interface I2, the windows of opportunities for additional content/information/applications to be added on the multimedia channel provided to the user can be defined, predicted and/or qualified by the opportunities selector G(y). This will then be used for the timely selection of the appropriate additional content AMD.

As an example: from his past and current zapping behavior, it is identified that a user X will stop zapping, or switching of channels, at channel Y. Therefore, channel Y can then already send to the user X some teasers for the programs to come. Or, from his interactivity classification on interactive applications, the user X will probably like to get interactive advertisements when using an interactive DTV application. This can also be provided by means of the opportunities selector G(y).

As another example: user X is watching channel Y and interacts with an interactive application Z. From this data it is possible to deduct some quantitative statistics such as channel Y has T people watching and interactive application Z has R people participating. Additionally, the qualitative behavior classifier F(x) gives more adequate information for content and application adaptation. In more detail, F(x) classifies the user behavior in some classes. For instance, the number of changes in channel selection can classify the user X in a specific "zapping" class. This user behavior can be, for instance, application interactivity, communication in a community application, emoticons used in a community application, ...

From current and past consumer behavior, the qualitative behavior classifier F(x) can also predict the future behavior of the consumer, i.e. of the end-user X. Again as an example: a user X is on channel 3 and starts zapping in a upwards way, from his past behavior, the probability that he will stop at channel 8 is then predicted.

All this information is passed to the opportunities selector G(y) over the interface I2.

Under control of the opportunities selector G(y), additional content, e.g. advertisements, meta-information, iTV applications, trailers, is then send to the multimedia data combiner H(z) via the second content selector ACS. This additional content is published either in-band, by e.g. mixing, overlay operation, . . . by the multimedia data combiner H(z) on/over the selected broadcast channel, or out-band, e.g. via a return channel. Finally, the end-user gets his broadcast channel adapted with the content that was selected based on his consumption behavior.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A system comprising:
a user behavior analyzer to which an end-user can couple, said user behavior analyzer being adapted to analyze the behavior of said end-user with respect to a plurality of content providers adapted to transmit first multimedia data to said end-user via a first content selector controllable by said end-user to transmit the first multimedia data from a selected one of said content providers,
wherein said user behavior analyzer is adapted to transmit input controls signals to an opportunities selector, adapted (i) to receive additional input control signals from a plurality of additional content providers adapted to transmit second multimedia data to said end-user via a second content selector and (ii) to cause said second content selector to transmit to said end-user said second multimedia data from a selected one of said additional content providers; and
a multimedia data combiner adapted to combine said second multimedia data with the first multimedia data into a combined multimedia data signal and to transmit said combined multimedia data signal to said end-user.

2. The system according to claim 1, wherein said opportunities selector is adapted to receive the additional input control signals that contain information about multimedia data available for transmission to said end user from said additional content providers.

3. The system according to claim 1 wherein:
said user behavior analyzer comprises:
a quantitative behavior classifier adapted to be coupled to said end-user and further adapted to analyze the quantitative behavior of said end-user, and
a qualitative behavior classifier to which said quantitative behavior classifier is coupled, the qualitative behavior classifier being adapted to classify the behavior of said end-user and to predict future behavior of said end-user,
wherein both said quantitative behavior classifier and said qualitative behavior classifier are adapted to provide control signals to be applied to said opportunities selector.

4. The system according to claim 3, wherein said user behavior analyzer is adapted to analyze the end-user behavior comprising information about selection behaviors of said end-user.

5. The system according to claim 1, wherein said opportunities selector is adapted to transmit information about the end-user's behavior to said additional content providers.

6. The system according to claim 1, wherein at least one of said plurality of content providers is also one of the plurality of additional content providers.

7. The system according to claim 1, wherein said user behavior analyzer is adapted to be coupled to said end-user via a set-top box located at the end-user's premises.

8. The system according to claim 7, wherein said set-top box is adapted to be coupled to said first content selector to cause said first content selector to transmit to said end-user the first multimedia data from the selected one of said content providers to said.

* * * * *

UNITED STATES PATENT AND TRADEMARK OFFICE
CERTIFICATE OF CORRECTION

PATENT NO. : 8,484,675 B2  
APPLICATION NO. : 11/190832  
DATED : July 9, 2013  
INVENTOR(S) : Toon Coppens et al.

Page 1 of 1

It is certified that error appears in the above-identified patent and that said Letters Patent is hereby corrected as shown below:

On the Title Page

- In Foreign Application Priority Data Item (30), replace "EP 04291975" with --EP 04291975.3--.

In the Claims

- In column 6, line 25, replace "controls" with --control--.

- In column 6, line 25, remove the ",".

- In column 8, line 5, remove "to said".

Signed and Sealed this  
Seventh Day of January, 2014

Margaret A. Focarino  
*Commissioner for Patents of the United States Patent and Trademark Office*